United States Patent Office 3,224,034
Patented Dec. 21, 1965

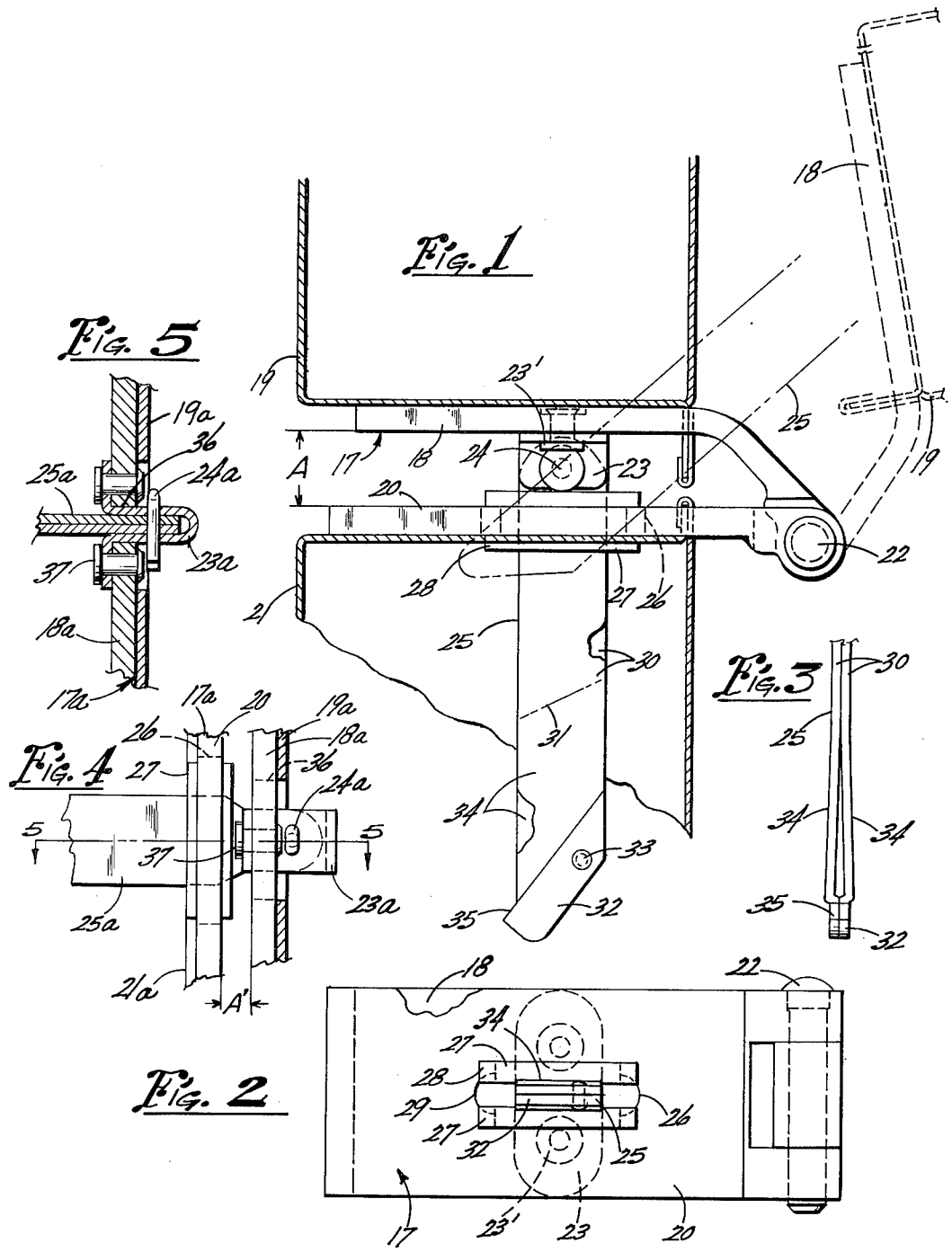

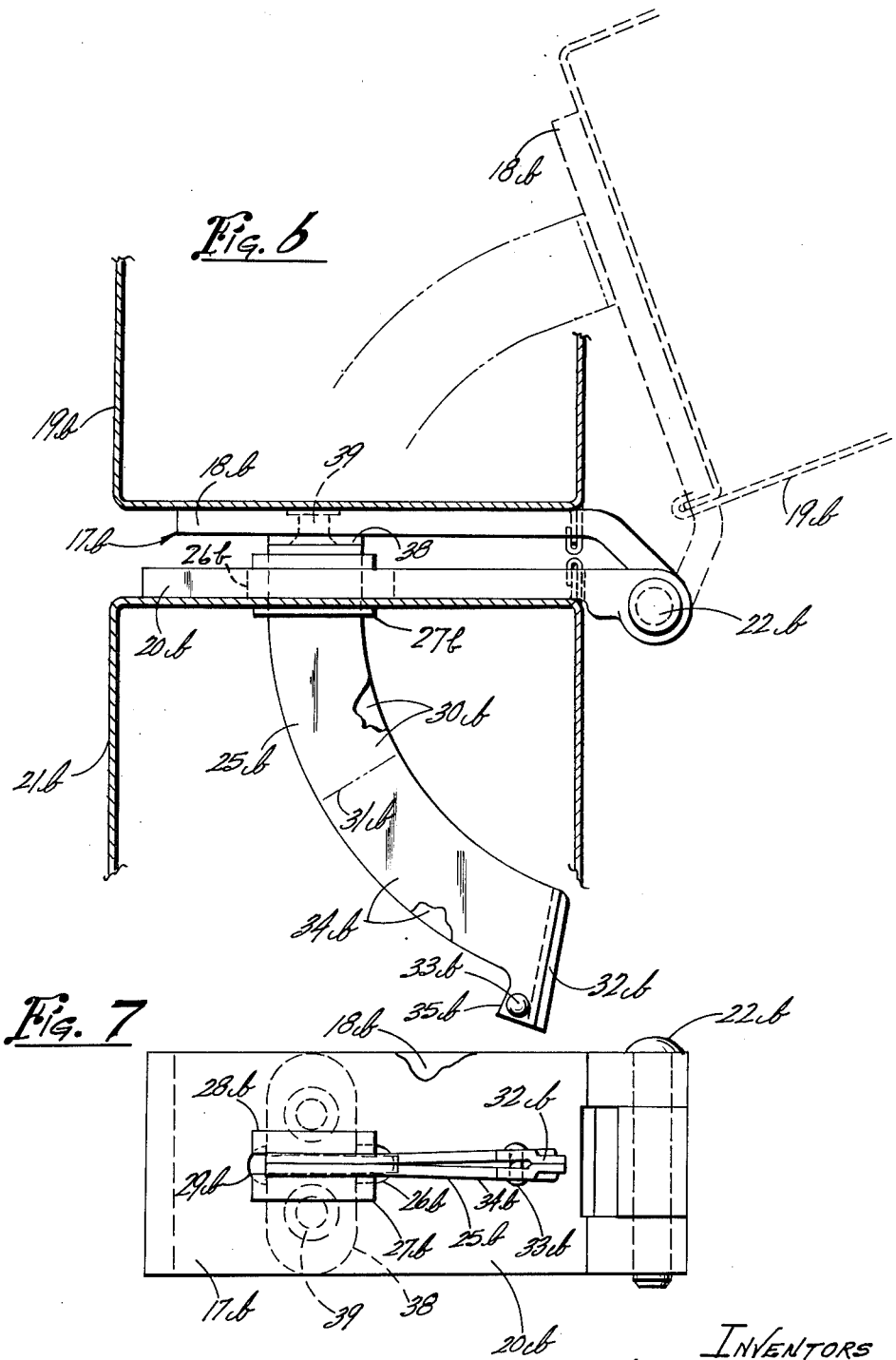

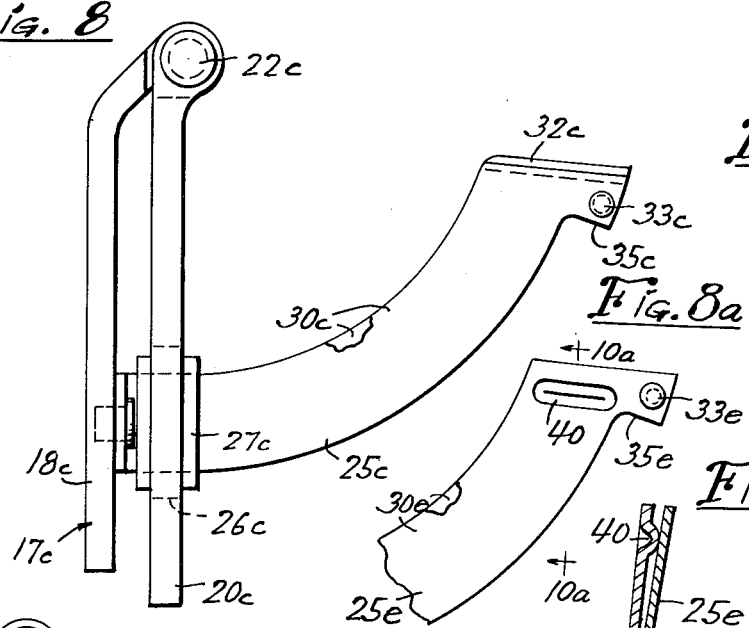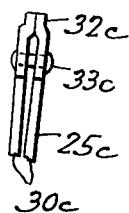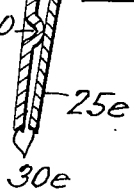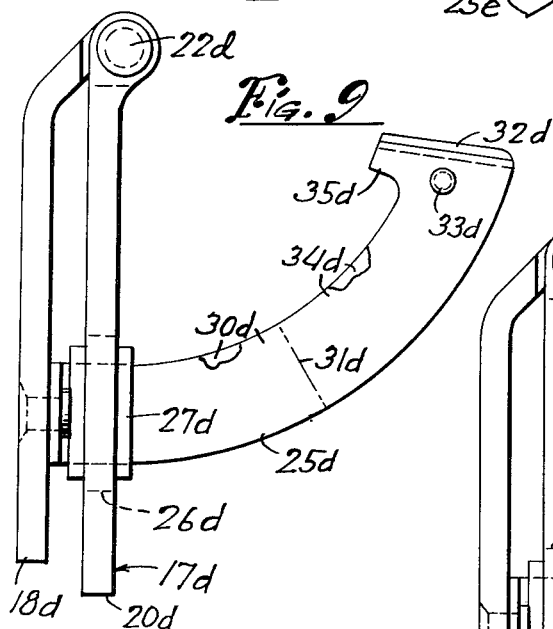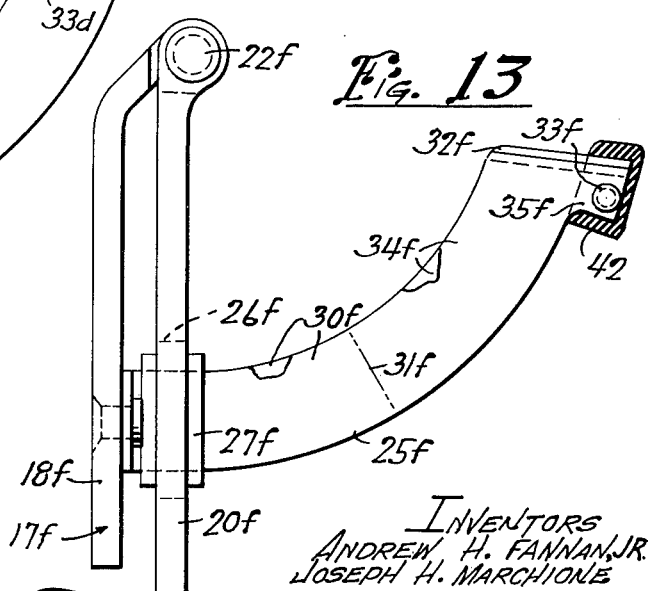

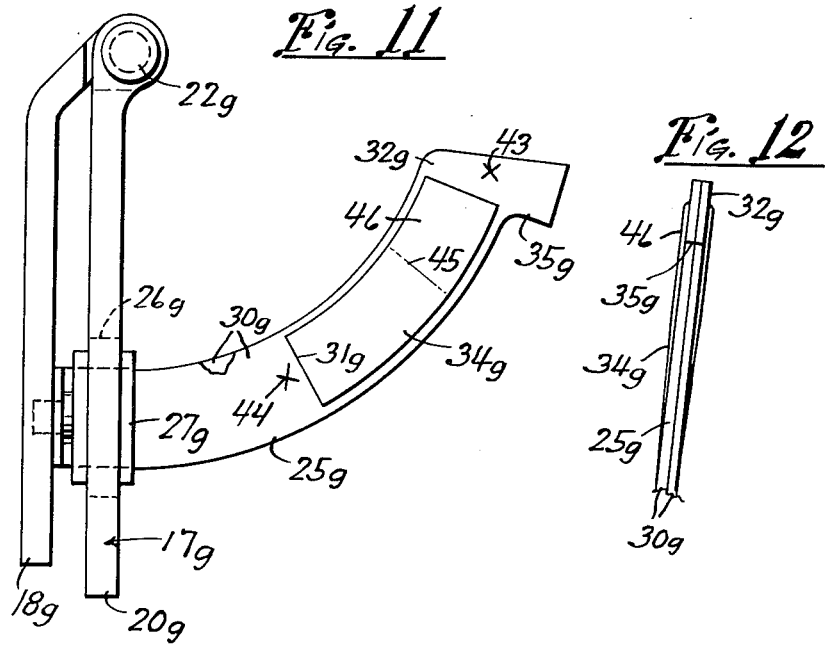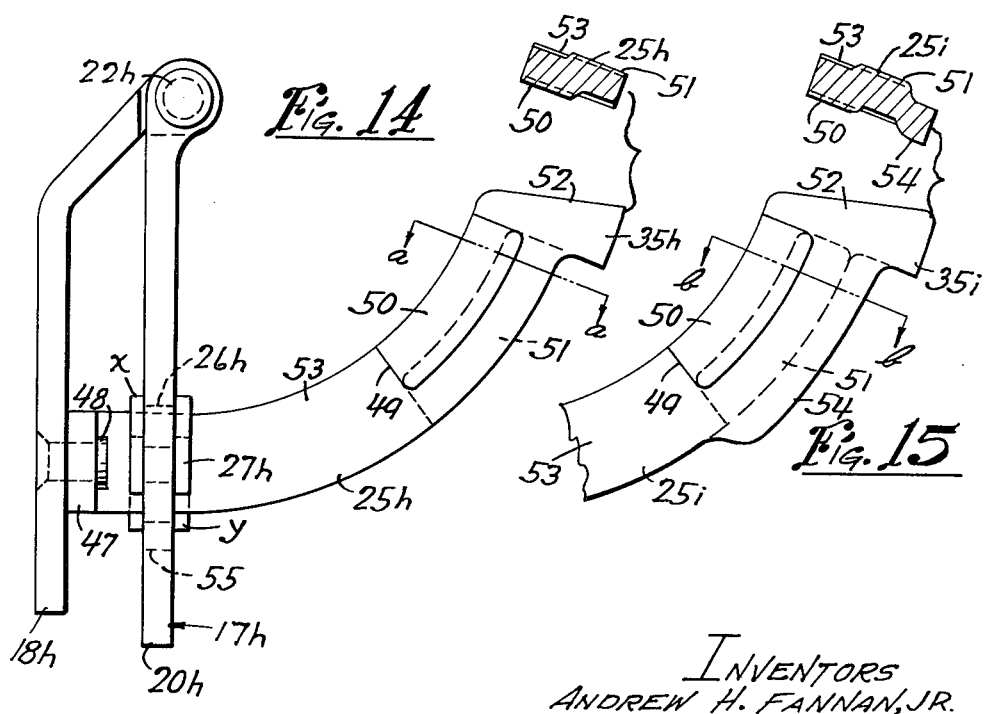

3,224,034
BUTT TYPE DOOR HINGES WITH FRICTION TYPE HOLD-OPEN MEANS
Andrew H. Fannan, Jr., and Joseph H. Marchione, Rockford, Ill., assignors to L. W. Menzimer, trustee, Rockford, Ill.
Filed Oct. 15, 1962, Ser. No. 230,332
12 Claims. (Cl. 16—142)

This invention relates to automobile door hinges and is more particularly concerned with improvements in butt type hinges embodying friction type hold-open means.

The principal object of our invention is to provide simple, economical and durable as well as thoroughly practical friction type hold-open means for butt type hinges in which flat strips or pads of wear resisting friction material similar to what is commonly used for brake linings are mounted on opposite sides of a slot in the shank portion of one hinge butt at an appreciable distance from the pintle and slidably frictionally engage wide flat surfaces on opposite sides of an arm attached to the shank portion of the other hinge butt and movable endwise between said pads in the opening and closing of the door, the arm being straight on certain designs where it is pivotally connected to the other hinge butt, and of arcuate form with the pintle as a center of the arc where the arm is rigidly attached to the other hinge butt, the straight pivoted arm being preferred in view of its greater adaptability to different automobile door pillars.

Another object of our invention is to provide improved sliding friction means, some utilizing an arm formed by a single elongated piece of sheet metal of suitable thickness with oppositely inclined ramp portions struck therefrom in opposite directions to give gradually increasing frictional resistance to opening of the door, and others having the arm made up of two elongated strips of thinner and therefore more readily flexible sheet metal, these forms in some instances having oppositely inclined ramps defined on the two strips at their outer ends to provide substantially uniform frictional resistance to mid-open position followed by gradually increasing frictional resistance the rest of the way to fully opened position. In other instances, the two strips define a V giving gradually increasing frictional resistance to opening of the door from start to finish. In most cases, the opening movement is preferably positively limited by a stop projection provided on the outer end of the arm which strikes the fixed hinge butt alongside the slot provided therein, and when this stop projection is provided with a rubber bumper a silencing and cushioning action is obtained. In most of the two-piece arm constructions the outer ends of the two sheet metal pieces are preferably riveted together, but spot-welding is used in some cases.

The attaching shank portions of the hinge butts require different spacing on different cars, and where these shank portions are disposed in too close proximity to permit attachment of the bracket for the pivoting of the friction arm in the usual way extending from the outer face, we provide a slot in the attaching portion and a registering opening in the wall of the pillar or door and reverse the bracket so that it projects into the pillar, thereby making the invention substantially universally adaptable.

The invention is illustrated in the accompanying drawings, in which—

FIG. 1 is a horizontal section through the edge portion of an automobile door and the door pillar, illustrating a butt type hinge having a pivoted friction arm thereon as a part of its hold-open and stop means, made in accordance with our invention, giving uniform frictional resistance to door opening movement up to a mid-position and gradually increasing resistance up to fully opened position;

FIG. 2 is a side view of the hinge by itself;

FIG. 3 is an edgewise view of a portion of the friction arm to better illustrate its two-piece construction;

FIGS. 4 and 5 are fragmentary views illustrating a modification of the construction shown in FIGS. 1 to 3, FIG. 5 being a section on the line 5—5 of FIG. 4;

FIGS. 6 and 7 are views similar to FIGS. 1 and 2, respectively, showing a rigid arcuate friction arm as a part of still another hold-open and stop means, giving frictional resistance comparable to the construction of FIGS. 1 and 2;

FIGS. 8 and 9 are related views of another butt hinge like that shown in FIGS. 6 and 7 showing two further variations of the open and stop means;

FIG. 8a being a fragmentary view related to FIG. 8 showing, instead of the abutting depressed outer end portions on the strips of FIG. 8, a rib on the outer end portion of one strip in FIG. 8a engaging and spacing the outer end portion of the other strip, for a similar purpose;

FIG. 10 is an edgewise view of the friction arm shown in FIG. 8, while FIG. 10a is a section of FIG. 8a, both views showing how the spaced strips define a V, for a gradually increasing frictional resistance to door opening movement from start to finish;

FIGS. 11 and 12 are views corresponding to FIGS. 8 and 10 showing another construction of friction arm as a part of another hold-open and stop means;

FIG. 13 is a view like FIG. 9, showing a somewhat similar form of friction arm as a part of the hold-open and stop means, this arm including a rubber bumper on the stop projection, and FIGS. 14 and 15 are views similar to FIGS. 9 or 11 but showing a single piece friction arm on each instance, these views including sectional details on the lines a—a and b—b, respectively, to better illustrate the constructions.

Similar reference numerals are applied to corresponding parts throughout the views.

Referring first to FIGS. 1 to 3, the reference numeral 17 designates a butt type hinge that has the attaching shank portion of one butt 18 suitably secured to the edge portion of an automobile door 19, and the attaching shank portion of the other butt 20 suitably secured to the door pillar 21 on the body, the outer knuckle ends of the two butts being pivotally connected in the usual way by a pintle 22. In accordance with our invention, we provide the hinge with a simple friction type hold-open and stop means of extremely practical, serviceable, and economical construction applied to the attaching shank portions of the hinge butts, butt 18 having the two halves of a bracket 23 riveted thereto, as indicated at 23' and pivotally connected, as at 24, to one end of an elongated straight friction arm 25, while butt 20 has a longitudinal slot 26 provided therein in which a pair of strips or pads 27 are mounted on the opposite sides thereof and retained against displacement by notched end portions 28 that straddle the opposite ends of the shorter side portions of the slot but can be passed easily through the extended middle portion 29 of the slot in assembling the pads or butt 20 before the inner or pivoted end of the friction arm 25 is forced between the pads and pivotally connected at 24 with the brackets 23. The arm 25, as clearly appears in FIGS. 2 and 3, is built up of two strips 30 of steel having the desired resilience and are flat and have surface to surface engagement from pivot pin 24 out to line 31 and also at the depressed outer end portions 32, where the two strips are suitably riveted together, as indicated at 33. Between the line 31 and the outer end portions 32, the two strips 30 have ramp portions 34 formed thereon by pressure between dies, whereby to give gradually increasing frictional resistance to door opening movement from a mid-position to the point of the fully opened position indicated in dotted lines in FIG. 1, at which point a stop projection 35 defined on one end of the outer end portions 32 strikes the back of the butt 20 alongside the slot 26. Notice in the dotted line position of the friction arm 25 in FIG. 1 how the opposite edge of the arm 25 remote from stop 35 rides against the adjacent end of the slot 26 when the door 19 is in the fully opened position. That not only insures full engagement of the stop projection 35 with the back of butt 20 but also distributes the load imposed on arm 25 when the door reaches the limit position, and this is important because the door is sometimes thrown open violently, or wind pressure will occasionally cause similar violent movement of the door to fully opened position, and, if the force were not distributed in this way and all of the force was applied to the stop projection 35, there might be danger of the arm 25 being bent out of shape and ultimately requiring replacement.

In operation, the friction pads 27, which are preferably molded of brake lining material or made of any other suitable, long wearing, quietly operating friction material, are subjected to a certain amount of compression by the forcible entry therebetween of the relatively thin inner end portion of the arm 25, so that appreciable friction drag is thereby imposed upon the door movement, this friction drag being substantially uniform up to the point where the door is about half-way open, namely, where the line 31 arrives at pads 27, and this is important because it is in this range that most door operations occur, the door being opened far enough to allow a person to enter or leave without too much difficulty and the door being opened this far readily enough in most garages and most parking lots. The restraint on the door movement is of advantage in holding the door in whatever position the operator desires and also reduces the likelihood of banging the door against a wall or adjacent car. In those other instances where a wider opening of the door is necessary or desirable, the ramps 34 exert gradually increasing frictional resistance to movement as these portions are subjected to more and more flattening between the friction pads 27 the wider the door is opened, maximum resistance to movement coming when the stop projection 35 strikes the back of butt 20 alongside one end of slot 26. At that point the opposite edge of the arm 25 also strikes the other end of slot 26, thereby providing a solid positive stop action and one in which the load is distributed, namely, enough to eliminate likelihood of any damage to the hold-open and stop means.

Where the space dimension A, indicated in FIG. 1, between the attaching portions of the two hinge butts is too small, as indicated at A' in FIG. 4, we provide a slot 36 in the attaching portion of the hinge butt 18a and provide preferably a one-piece, generally U-shaped bracket 23a having outwardly bent end portions riveted, as at 37, to the butt 18a on opposite sides of the slot and having the friction arm 25a pivoted therein, as by means of cotter pin 24a. The rest of the hold-open and stop means, including friction pads 27 entered in slot 26 in butt 20a, is the same as seen in FIGS. 1 to 3, and there is no difference in the operation.

Referring to FIGS. 6 and 7, the butt hinge 17b has a two-piece arcuate friction arm 25b rigidly mounted at one end on the attaching portion of butt 18b by riveting of the right angle end portions 38 to the outer face thereof, as indicated at 39, the arcs of the arm 25b being struck with the pintle 22b as a center. Friction pads 27b are mounted on opposite sides of the slot 26b in butt 20b, and, here again, the middle portion 29b of the slot is elongated or extended to admit the pads in the assembling operation, and the notched ends 28b of the pads serve to retain the pads against displacement from the side portions of the slot. The two strips 30b, of which arm 25b is made, are in flat surface to surface abutment from the riveted end 38 out as far as radial line 31b and also at their depressed extremities 32b, but there are ramp portions 34b from the line 31b out to the outer end portions 32b, to provide gradually increasing friction resistance to door opening movement from the mid-position up to the fully opened position, similarly as in the operation of hinge 17 in FIGS. 1 and 2. A rivet 33b fastens the outer end portions of the strips 30b together alongside the stop projection 35b. The operation, therefore, of this hinge 17b and its hold-open and stop means is quite similar to the operation of hinge 17, except that here the stop projection 35b bears the full brunt of limiting the door opening movement. In passing, attention is called to the fact that the door pillar 21b has to be much larger in section between the pintle 22b and friction pads 27b than is the case where a straight friction arm is employed, like arm 25 in FIG. 1, where the friction pads 27 can be located much closer to the outer wall of the door pillar.

Referring to FIGS. 8 and 9 and related FIGS. 19, 8a and 10a, the arcuate two-piece friction arms 25c, 25d and 25e in FIGS. 8, 9 and 8a respectively, are all of two-piece construction like arm 25b, arms 25c and 25d relying for the spacing of the outer ends of strips 30c and 30d on depressed portions 32c and 32d, respectively, while arm 25e has the outer end of one of its strips 30e provided with the rounded rib 40 projecting from the back transversely thereof and engaging the other strip for the spacing. In arms 25c and 25e the strips extend in diverging relationship to one another from the point where they project from the friction pads, numbered 27c in FIG. 8. Thus, with these constructions, there is a gradually increasing frictional resistance to door opening movement from start to finish, as distinguished from having a uniform frictional resistance up to the mid-open position and thereafter gradually increasing frictional resistance from that point to fully opened position, as in FIG. 9. A stop projection is provided at the outer end of each friction arm, the projection 35c in FIG. 8 and projection 35e in FIG. 8a being similar to projection 35b in FIG. 6, including a rivet (33c in FIG. 8, 33e in FIG. 8a) to fasten the projecting lug portions together. In FIG. 9, the rivet 33d is located at a mid-position, and the stop projection 35d is on the radially inner side of the arm 25d at the outer end. This arm 25d differs from arms 25c and 25e in having ramps 34d, like ramps 34b, outwardly from radial line 31d, to give similar operation.

Referring to FIG. 13, the two-piece friction arm 25f shown there is like that shown at 25c in FIG. 8 in all respects including the stop projection 35f which is like stop projection 35c and has two halves thereof riveted together, as indicated at 33f. However, in this form, a rubber cup 42 tightly encloses the stop projection 35f to give a silencing and cushioning action at the limit of door opening movement. Otherwise, the operation is the same as with the construction of FIGS. 6 and 9.

In the constructions of FIGS. 11 and 12 the two-piece friction arm 25g has the two strips 30g welded together at 43 and 44 at opposite ends of the embossed arcuate ramp portions 34g, these ramp portions diverging outwardly from a radial line 31g to a line 45 marking the inner end of a plateau portion 46, whereby to obtain operating characteristics with this huge closely approximating that obtained with the hinge of FIG. 6, except that after the uniform frictional resistance up to the mid-open position there is, with this hinge, a faster build-up in frictional resistance to further opening up to the point where line 45 reaches the friction pads 27g, and, from that point, the maximum friction is substantially uniform all the way to the fully opened position, opening movement being positively limited by means of stop projection 35g.

If desired, the ramps 34g can be decreased in rise a little, and the plateau portion 46, instead of having parallel surfaces, can have outwardly diverging surfaces, so that the door opening movement to the mid-point is against a uniform frictional drag, and thereafter, in the further opening, up to the line 45, there is an appreciable gradual increase in frictional resistance, up to the line 45, after which there is a further but less abrupt increase in frictional resistance than occurs in the opening from mid-position to line 45.

While we have shown all of the arcuate friction arms as *rigidly* mounted on the one hinge butt in concentric relation to the pintle and working between friction pads on opposite sides of a slot provided in the other hinge butt, it should be understood that we could have any of these rigidly mounted friction arms of FIGS. 6, 8, 9, 8a, 11 and 13 *pivotally* mounted, like arm 25 of FIG. 1, or arm 25a of FIG. 4, concentrically (or even eccentrically) relative to the pintle. The same applies in respect to the rigid one-piece friction arms shown in FIGS. 14 and 15, which we describe next.

In all of the two-piece arm constructions above described, the friction arms, whether straight or arcuate, are made of strips of relatively thin resilient material (usually steel) of uniform thickness. In FIGS. 14 and 15, we have illustrated two other forms, however, in which arcuate friction arms 25h and 25i are both of one-piece construction, utilizing thicker material, of approximately double the thickness of the material used in the other constructions, and, while we have shown in FIG. 14 how the right angle bent end portion 47 of arm 25h is riveted rigidly to the attaching portion of hinge butt 18h, as at 48, it should be clear that we could pivot the arm in the same way as arm 25 in FIG. 6 or arm 25a in FIG. 4, and, also, that we do not limit the use of this one-piece construction to arcuate arms, but could utilize one-piece straight arms pivoted in the same way as the arm 25 in FIG. 1 or arm 25a in FIG. 4. In order to obtain substantially the same gradual increase in frictional resistance to door opening movement outwardly from line 49 in both of these constructions, the strip is formed between dies to provide outwardly diverging ramps 50 and 51, portion 50 being embossed in one direction relative to the plane of the piece and portion 51 in the opposite direction relative to said plane, to give the equivalent of the ramps 34g in FIGS. 11 and 12, for example, or more specifically similarly as the ramps in the construction of FIGS. 1 and 6. The triangular shaped outer end portion 52 in each case is in the same plane as the inner end portion 53, and provides the stop projection 35h in FIG. 14 and 35i in FIG. 15 to limit door opening movement when the door reaches the fully opened position, similarly as in the other constructions previously described. To offset a tendency for the outer end portion of the arm with the ramps 50 and 51 defined thereon twisting under the build-up in frictional resistance as these ramp portions are subjected to a flattening action in opposite directions to sliding between the friction pads 27h, we may provide an arcuate heel portion 54 concentric with the outer end portion of the arm, as shown in FIG. 15, disposed nearly, and if not actually, in coplanar relationship with portions 52 and 53, this heel portion being slidably guided in a narrow extension 55 of the slot 26h provide in butt 20h, as indicated in FIG. 14, serving to limit this twisting action and thereby insure uniformly good gradual build-up frictional resistance to door opening movement beyond the mid-open position of the door. Due to the radially offset relationship of ramps 50 and 51, the pads 27h are preferably arranged in a similarly offset relationship, as indicated in FIG. 14, the pad x on one side of slot 26 that cooperates with ramp 50 being disposed closer to pintle 22 than the pad y on the other side of the slot that cooperates with ramp 51. These pads are also appreciably shorter than the pads in the other constructions where they have frictional engagement the full width of the arm.

It is believed the foregoing description conveys a good understanding of the objects and advantages of our invention. The appended claims have been drawn to cover all legitimate modifications and adaptations.

We claim:

1. In a hinge comprising a first butt member having an elongated attaching portion, and a second butt member having an elongated attaching portion, the two butt members having knuckle portions on their outer ends pivotally connected by a pintle, the improvement consisting of an elongated friction arm connected to the attaching portion of the first butt member and extending therefrom through a slot provided in the attaching portion of the second butt member, said arm having wide flat surfaces on opposite sides thereof, friction pads mounted on opposite sides of said slot and having surface to surface door retarding frictional engagement with the opposite sides of said arm throughout opening and closing of the door for frictionally resisting opening and closing of said hinge, said arm including for an outer approximately half-portion of its length oppositely inclined and compressible ramp portions on opposite sides thereof substantially the full length thereof giving in the compression of said ramp portions between the friction pads gradually increasing resistance to opening of said door from approximately the mid-open to the fully opened position, and a stop projection on the outer end of said arm which by abutment on said second butt member alongside the slot limits hinge and door opening movement.

2. In a hinge comprising a first butt member having an elongated attaching portion, and a second butt member having an elongated attaching portion, the two butt members having knuckle portions on their outer ends pivotally connected by a pintle, the improvement consisting of an elongated friction arm connected to the attaching portion of the first butt member and extending therefrom through a slot provided in the attaching portion of the second butt member, said arm having wide flat surfaces on opposite sides thereof, friction pads mounted on opposite sides of said slot and having surface to surface door retarding frictional engagement with the opposite sides of said arm throughout opening and closing of the door for frictionally resisting opening and closing of said hinge, said arm including for an outer substantially half-portion of its length oppositely inclined compressible ramp portions on opposite sides thereof substantially the full length thereof giving in the compression of said ramp portions between the friction pads gradually increasing resistance to opening of said door from approximately mid-open to the fully opened position, a stop projection on the outer end of said arm which by abutment on said second butt member alongside the slot limits hinge and door opening movement, and sound deadening and cushioning means carried on said stop projection to engage the second butt member alongside the slot at the limit of hinge opening movement.

3. In a hinge comprising a first butt member having an elongated attaching portion, and a second butt member having an elongated attaching portion, the two butt members having knuckle portions on their outer ends pivotally connected by a pintle, the improvement consisting of an elongated friction arm connected to the attaching portion of the first butt member and extending therefrom through a slot provided in the attaching portion of the second butt member, said arm having wide flat surfaces on opposite sides thereof, friction pads mounted on opposite sides of said slot and having surface to surface door retarding frictional engagement with the opposite sides of said arm throughout opening and closing of the door for frictionally resisting opening and closing of said hinge, said arm being of one piece flexible resilient material and including for an outer approximately half-portion of its length portions of the width thereof formed to provide oppositely inclined compressible ramp portions which in the compression thereof between said friction pads provides gradually increasing frictional resistance to opening movement, and a stop projection on the outer end of said arm which by abutment on said second butt member alongside the slot limits hinge opening movement.

4. In a hinge comprising a first butt member having an elongated attaching portion, and a second butt member having an elongated attaching portion, the two butt members having knuckle portions on their outer ends pivotally connected by a pintle, the improvement consisting of an elongated friction arm connected to the attaching portion of the first butt member and extending therefrom through a slot provided in the attaching portion of the second butt member, said arm having wide flat surfaces on opposite sides thereof, friction pads mounted on opposite sides of said slot and having surface to surface engagement with the opposite sides of aid arm for frictionally resisting opening and closing of said hinge, said arm being of one piece flexible resilient material and having portions of the width of the outer end portion thereof formed to provide oppositely inclined compressible ramp portions which in the compression thereof between said friction pads provides gradually increasing frictional resistance to opening movement, the slot in the second butt member having an extension on one end thereof adapted to serve as a guide for slidably receiving an edge portion of said friction arm to resist a tendency for the outer end portion of said arm to twist in the compression of said ramp portions, and an elongated guide projection provided on one edge portion of said arm at the outer end slidably engageable in said slot extension.

5. In a hinge comprising a first butt member having an elongated attaching portion, and a second butt member having an elongated attaching portion, the two butt members having knuckle portions on their outer ends pivotally connected by a pintle, the improvement consisting of said first butt member having a slot provided therein, a bracket mounted on said first butt member providing a support behind said first butt member at said slot, an elongated straight friction arm having one end portion extending through said slot and pivotally connected to said bracket behind said first butt member and extending from said first butt member through a slot provided in the attaching portion of the second butt member, and friction means mounted on said second butt member frictionally engaging said arm to resist the opening and closing of the hinge, the slot in the second butt member being wider than said friction arm, and said friction arm having a slot projection on one side thereof at the outer end which by abutment on said second butt member alongside one end of said slot limits hinge opening movement, while the other side of said arm engages the other end of the slot, thereby distributing the load.

6. In a hinge comprising a first butt member having an elongated attaching portion, and a second butt member having an elongated attaching portion, the two butt members having knuckle portions on their outer ends pivotally connected by a pintle, the improvement consisting of an elongated friction arm comprising two connected strip portions of flexible resilient material providing wide flat surfaces on their outer sides, said arm being connected at one end to the attaching portion of the first butt member and extending therefrom through a slot provided in the attaching portion of the second butt member, friction pads mounted on opposite sides of said slot and having surface to surface door retarding frictional engagement with the outer sides of said strip portions throughout opening and closing of the door for frictionally resisting opening and closing of said hinge, said strips including for an outer substantially half-portion of their length oppositely inclined compressible ramp portions on opposite sides thereof substantially the full length thereof giving in the compression of said ramp portions between the friction pads gradually increasing resistance to opening of said door from approximately the mid-open to the fully opened position, means spacing the ends of said strip portions at the outer end of said arm so that the ramp portions together define a V outwardly from said friction pads, means interconnecting the ends of said strip portions at the extremity of said arm, and a stop projection on the extremity of said arm which by abutment on said second butt member alongside the slot limits hinge opening movement.

7. In a hinge comprising a first butt member having an elongated attaching portion, and a second butt member having an elongated attaching portion, the two butt members having knuckle portions on their outer ends pivotally connected by a pintle, the improvement consisting of an elongated friction arm comprising two connected strip portions of flexible resilient material providing wide flat surfaces on their outer sides, said arm being connected at one end to the attaching portion of the first butt member and extending therefrom through a slot provided in the attaching portion of the second butt member, friction pads mounted on opposite sides of said slot and having surface to surface door retarding frictional engagement with the outer sides of said strip portions throughout opening and closing of the door for frictionally resisting opening and closing of said hinge, said strip portions being disposed in close abutment outwardly from said first butt member to a point intermediate the ends thereof and also at their outer ends but being formed between said intermediate point and said outer ends to define outwardly diverging depressible ramp portions, whereby in the opening of said hinge there is substantially uniform frictional resistance afforded by said arm sliding between said friction pads up to said intermediate point, and thereafter gradually increasing frictional resistance up to fully opened position, means interconnecting the ends of said strip portions at the extremity of said arm, and a stop projection on the extremity of said arm which by abutment on said second butt member alongside the slot limits hinge opening movement.

8. In a hinge comprising a first butt member having an elongated attaching portion, and a second butt member having an elongated attaching portion, the two butt members having knuckle portions on their outer ends pivotally connected by a pintle, the improvement consisting of an elongated friction arm comprising two connected strip portions of flexible resilient material providing wide flat surfaces on their outer sides, said arm being connected at one end to the attaching portion of the first butt member and extending therefrom through a slot provided in the attaching portion of the second butt member, and friction pads mounted on opposite sides of said slot and having surface to surface door retarding frictional engagement with the outer sides of said strip portions throughout opening and closing of the door for frictionally resisting opening and closing of said hinge, said strip portions being disposed in close abutment their full length but having compressible embossed ramp portions defined thereon outwardly from a point intermediate the ends of said strip portions to a point near the outer ends, these embossed ramp portions being disposed in outwardly diverging relationship to one another to provide gradually increasing frictional resistance to opening movement from an intermediate partway open position in the compression of said embossed ramp portions by their sliding engagement between said friction pads.

9. A hinge as set forth in claim 8, wherein the embossed ramp portions include flat portions at their outer ends that are substantially parallel to one another, so as to provide substantially uniform maximum frictional resistance to door opening movement near the fully opened position of said hinge.

10. A hinge as set forth in claim 8, including means interconnecting the ends of said strip portions at the outer end of said arm, and a stop projection on the outer end of said arm which by abutment on said second butt member alongside the slot limits hinge opening movement.

11. In a hinge comprising a first butt member having an elongated attaching portion, and a second butt member having an elongated attaching portion, the two butt members having knuckle portions on their outer ends pivotally connected by a pintle, the improvement consisting of an elongated friction arm connected to the attaching portion of the first butt member and extending therefrom through a slot provided in the attaching portion of the second butt member, said arm having wide flat surfaces on opposite sides thereof, friction pads mounted on opposite sides of said slot and having surface to surface door retarding frictional engagement with the opposite sides of said arm throughout opening and closing of the door for frictionally resisting opening and closing of said hinge, said arm including for an outer approximately half-portion of its length oppositely inclined and compressible ramp portions on opposite sides thereof substantially the full length thereof giving in the compression of said ramp portions between the friction pads gradually increasing resistance to opening of said door from approximately the mid-open to the fully opened position, and a stop projection on the outer end of said arm which by abutment on said second butt member alongside the slot limits hinge and door opening movement, the slot in said second butt member being substantially rectangular and said friction pads being also substantially rectangular, said slot being elongated at the middle enough to permit passing the full length of each pad therethrough, and both pads having middle portions at both ends cut away to admit the thickness of said second butt member in assembling said friction pads on opposite sides of said slot in spaced parallel relationship to one another, the cut-away portions on the ends of each pad at the middle defining retaining projections on said ends which by abutment with said second butt member at the opposite ends of said slot prevent displacement of the pads from assembled position in said slot.

12. In a hinge comprising a first butt member having an elongated attaching portion, and a second butt member having an elongated attaching portion, the two butt members having knuckle portions on their outer ends pivotally connected by a pintle, the improvement consisting of an elongated friction arm connected to the attaching portion of the first butt member and extending therefrom through a slot provided in the attaching portion of the second butt member, said arm having wide flat surfaces on opposite sides thereof, and friction pads mounted on opposite sides of said slot and having surface to surface door retarding frictional engagement with the opposite sides of said arm throughout opening and closing of the door for frictionally resisting opening and closing of said hinge, said arm including for an outer approximately half-portion of its length oppositely inclined and compressible ramp portions on opposite sides thereof substantially the full length thereof giving in the compression of said ramp portions between the friction pads gradually increasing resistance to opening of said door from approximately the mid-open to the fully opened position, the slot in the second butt member being wider at its middle portion than said friction arm and said friction arm having a stop projection on one side thereof at the outer end which by abutment on said second butt member alongside one end of said wider middle portion of said slot limits door opening movement, while the other side of said arm engages the other end of the wider middle portion of said slot thereby distributing the load, the widened middle portion of said slot being wide enough to permit passing the full length of each pad therethrough, and both pads having middle portions at both ends cut away to admit the thickness of said second butt member in assembling said friction pads on opposite sides of said slot in spaced parallel relationship to one another, the cut-away portions on the ends of each pad at the middle defining retaining projections on said ends which by abutment with the second butt member at the opposite ends of said slot prevent displacement of the pad from assembled position in said slot.

References Cited by the Examiner

UNITED STATES PATENTS

| | | | |
|---|---|---|---|
| 554,149 | 8/1895 | Wheat | 24—202 |
| 1,385,800 | 7/1921 | Soss | 16—135 |
| 1,678,499 | 7/1928 | Eastman | 16—86 X |
| 1,699,758 | 1/1929 | Sharp | 16—82 |
| 1,752,423 | 4/1930 | Eastman | 16—86 |
| 1,791,691 | 2/1931 | Stevens | 16—191 X |
| 2,125,010 | 7/1938 | Wright | 16—86 |
| 2,155,167 | 4/1939 | Lefevre | 16—86 |
| 2,232,498 | 2/1941 | Travis | 16—86 |
| 2,523,088 | 9/1950 | Beyer | 16—86 |
| 2,677,851 | 5/1954 | Beyer | 16—86 |
| 2,773,278 | 12/1956 | Atwood et al. | 16—141 |
| 2,775,781 | 1/1957 | Morgan. | |
| 2,882,548 | 4/1959 | Roethel | 16—86 |

FOREIGN PATENTS

| | | |
|---|---|---|
| 500,123 | 2/1954 | Canada. |
| 872,692 | 2/1942 | France. |
| 1,143,995 | 4/1957 | France. |
| 1,191,040 | 6/1959 | France. |
| 704,206 | 2/1954 | Great Britain. |
| 790,782 | 2/1958 | Great Britain. |

JOSEPH D. SEERS, *Primary Examiner.*

DONLEY J. STOCKING, *Examiner.*

J. G. GILFILLAN, D. GRIFFIN, *Assistant Examiners.*